United States Patent [19]
Kuczenski

[11] Patent Number: 5,616,828
[45] Date of Patent: Apr. 1, 1997

[54] APPARATUS AND METHOD FOR TESTING HYDROPHOBIC FILTERS

[75] Inventor: Michael T. Kuczenski, Bristol, Conn.

[73] Assignee: Pfizer Inc., New York, N.Y.

[21] Appl. No.: 596,139

[22] PCT Filed: Jul. 7, 1994

[86] PCT No.: PCT/IB94/00203

§ 371 Date: Feb. 20, 1996

§ 102(e) Date: Feb. 20, 1996

[87] PCT Pub. No.: WO95/06515

PCT Pub. Date: Mar. 9, 1995

[51] Int. Cl.$^6$ .............................. G01N 15/08; B09B 1/00; G01M 3/26
[52] U.S. Cl. ........................................... 73/38; 73/40
[58] Field of Search .................... 73/38, 40, 40.5

[56] References Cited

U.S. PATENT DOCUMENTS

| | | | |
|---|---|---|---|
| 4,701,861 | 10/1987 | Kauke | 364/502 |
| 4,956,993 | 9/1990 | Mehler | 73/38 |
| 5,103,654 | 4/1992 | Gee et al. | 73/73 |
| 5,138,870 | 8/1992 | Lyssy | 73/38 |
| 5,394,737 | 3/1995 | Prange et al. | 73/38 |
| 5,417,101 | 5/1995 | Weich | 73/38 |
| 5,438,862 | 8/1995 | Keating et al. | 73/49.2 |
| 5,457,986 | 10/1995 | DiLeo et al. | 73/38 |
| 5,507,959 | 4/1996 | Glick | 210/797 |

*Primary Examiner*—Hezron E. Williams
*Assistant Examiner*—J. David Wiggins
*Attorney, Agent, or Firm*—Peter C. Richardson; Gregg C. Benson; A. Dean Olson

[57] ABSTRACT

A test apparatus for the in situ, non destructive, integrity testing of hydrophobic filters and/or their housings that is less sensitive to error from system pressure leaks. The apparatus comprises a pressurizable system including a pipe having an upstream end and a downstream end and a hydrophobic filter housing disposed inbetween. The hydrophobic filter housing has a hydrophobic filter disposed therein. The hydrophobic filter housing has an inlet which is in fluid communication with the upstream end of the pipe and the hydrophobic filter housing is closed to the downstream end of the pipe, but a fluid pathway to the downstream end of the pipe exists through the hydrophobic filter. The system has a second inlet including a flowmeter and the second inlet is disposed upstream of the downstream end of the pipe. An overflow outlet is disposed upstream of the hydrophobic filter and second inlet and is in fluid communication with a flow measurement device. A gas pressure outlet is disposed upstream of the overflow outlet and is in fluid communication with the flow measurement device through a separate pressure equalization tube. The system may be used by filling the above described pressurizable system with water such that the hydrophobic filter is completely immersed in water, controlling the gas pressure in the pressurizable system to a predetermined pressure, metering water into the system through the second inlet at a rate that is no greater than the rate of flow achievable through the overflow outlet, measuring the rate of water flow from the overflow outlet and determining the difference between the water inflow rate and the water overflow rate.

12 Claims, 1 Drawing Sheet

APPARATUS AND METHOD FOR TESTING HYDROPHOBIC FILTERS

BACKGROUND OF THE INVENTION

This field of art to which this invention pertains is hydrophobic filters and more particularly apparatuses and methods for testing hydrophobic filters.

Fermentation is an important process in the pharmaceutical industry that is used to make a variety of products such as hormones, enzymes, amino acids, antibiotics, and blood substitutes. The most commonly used organisms for manufacturing pharmaceutical products by fermentation are bacteria, fungi, and mammalian cells. During the manufacturing process it is important to keep contaminating organisms from being introduced into the fermentation system. For this reason, fluids that come in contact with the fermentation broth are sterilized. However, maintaining sterility is a challenge because an industrial fermentation can last up to twenty-one days. Air is typically used in the fermentation process (e.g.,for agitation, for transferring liquid to or from the fermentor and for sparging the fermentor to ensure an adequate oxygen supply) and thus, the air distribution system is a well-recognized way of introducing microbial contaminants to the fermentation system.

Recently microporous filter (membrane) cartridges have been used to provide a safe and reliable method of removing contaminants. Membrane filters are screen filters that retain particles by sieving and adsorption or size exclusion. Typically micropous membranes used in sterilizing applications will exclude particles as small as 0.1 µm to 0.5 µm based upon the actual membrane selected. Most sterilizing applications use 0.2 µm rated membranes. There are generally two types of microporous cartridge filters, hydrophilic filters and hydrophobic filters. Hydrophilic filters are typically made from cellulose, modified polyvinylidene fluoride or nylon and are generally used in aqueous liquid filtration. In contrast, hydrophobic filters are generally used in gas filtration and liquid solvent applications. Typical hydrophobic membrane materials include polyvinylidene fluoride and polytetrafluoroethylene. The microporous membranes used in fermentation applications are manufactured from inert polymers that are cast in continuous sheets. The membrane manufacturing process is tightly controlled to give defined retention, high porosity, and reproducible porosymmetric profiles.

It is important that membrane filter cartridges provide reliable particle removal and longevity while withstanding the stresses that accompany production (e.g., heat sterilization cycles). The use of membrane filters in critical applications, those where retention characteristics must be ensured prior to actual use, requires that the integrity of the membrane be tested prior to implementation in the respective process. This requirement necessitates the use of a nondestructive integrity test. The integrity of hydrophobic membrane filters and their ability to retain bacteria, has been correlated to a solvent based nondestructive integrity test. Current test methods use solvents to wet the membranes in order to conduct integrity tests on the hydrophobic filters (e.g., bubble point and diffusion integrity tests). However solvent based integrity tests make it difficult to test in situ following sterilization of the filters because of the risk of downstream solvent contamination, the addition of an expensive solvent drying (i.e. removal) step and precautions needed for safe handling of solvents. Clearly, it is desirable to be able to test, in situ, the filters subsequent to sterilization to provide absolute assurance that the filter and/or filter housing has not lost its integrity during the sterilization process.

An alternative test methodology, the water pressure integrity test, allows for the in situ, post sterilization test of hydrophobic filters. The water integrity test is based on the capillary depression of non-wetting liquids on the outer surface of membranes. By their nature, hydrophobic membranes resist wetting by water. However, water repellent forces may be overcome by applying sufficient pressure to force water into the pores and wet out the membrane. The magnitude of the pressure can be inversely correlated to the pore size of the membrane (as the pore size decreases the pressure required increases). The water pressure integrity test measures the rate of water uptake of the hydrophobic filter and this rate has been directly correlated to the retention of bacterial challenges.

Typically water pressure integrity tests are conducted by flooding the filter housing with water under pressure. Any measured pressure drop is proportional to the rate of water permeation. However, these conventional water pressure integrity tests are all adversely affected by pressure leaks in system valving and piping, These leaks mask true test values and cause "false test failures", and/or inconclusive integrity test results. In any industrial application, process valve leaks, flange leaks or other system component leaks are inevitable. It is not a trivial task to ensure that all components are free of leaks, nor is it practical to assume that a system can be maintained to achieve this.

Thus, there is a continuing search in the field of hydrophobic filters for methods for assuring the integrity of such filters.

SUMMARY OF THE INVENTION

This invention is directed to a test apparatus for the in situ, nondestructive, integrity testing of hydrophobic filters and/or their housings that is less sensitive to error from system pressure leaks. The apparatus comprises a pressurizable system including a pipe having an upstream end and a downstream end and a hydrophobic filter housing disposed inbetween. The hydrophobic filter housing has a hydrophobic filter disposed therein. The hydrophobic filter housing has an inlet which is in fluid communication with the upstream end of the pipe and the hydrophobic filter housing is closed to the downstream end of the pipe, but a fluid pathway to the downstream end of the pipe exists through the hydrophobic filter. The system has a second inlet including a means for metering a liquid and the second inlet is disposed upstream of the downstream end of the pipe. An overflow outlet is disposed upstream of the hydrophobic filter and second inlet and is in fluid communication with a measuring means for measuring the flow of a liquid. A second gas pressure outlet is disposed upstream of the overflow outlet and is in fluid communication with the measuring means through a separate pressure equalization tube.

Another aspect of this invention is directed to a method for the in situ, nondestructive, water integrity testing of hydrophobic filters and/or their housings that is less sensitive to error from system gas leaks. The method comprises filling the above described pressurizable system with water such that the hydrophobic filter is completely immersed in water, controlling the gas pressure in the pressurizable system to a predetermined pressure, metering water into the system through the second inlet at a rate that is no greater than the rate of flow achievable through the overflow outlet, measuring the rate of water flow from the overflow outlet and determining the difference between the water inflow rate and the water overflow rate.

This apparatus provides for the nondestructive, post-sterilization, in situ, water integrity testing of hydrophobic filters that is less dependent on maintaining the pressure integrity of the system. The invention is sensitive enough to detect and reproduce the extremely low flow rate measurements (e.g., less than 50 ml./min.). In addition, the simplicity of the invention allows for the easy adaptation of conventional filter systems using existing connections. Typically, this can also be done without removing the filter housing from process connections.

Other features and advantages will be apparent from the specification and claims and from the accompanying drawings which illustrate embodiments of the invention.

DETAILED DESCRIPTION OF THE INVENTION

Figure 1:
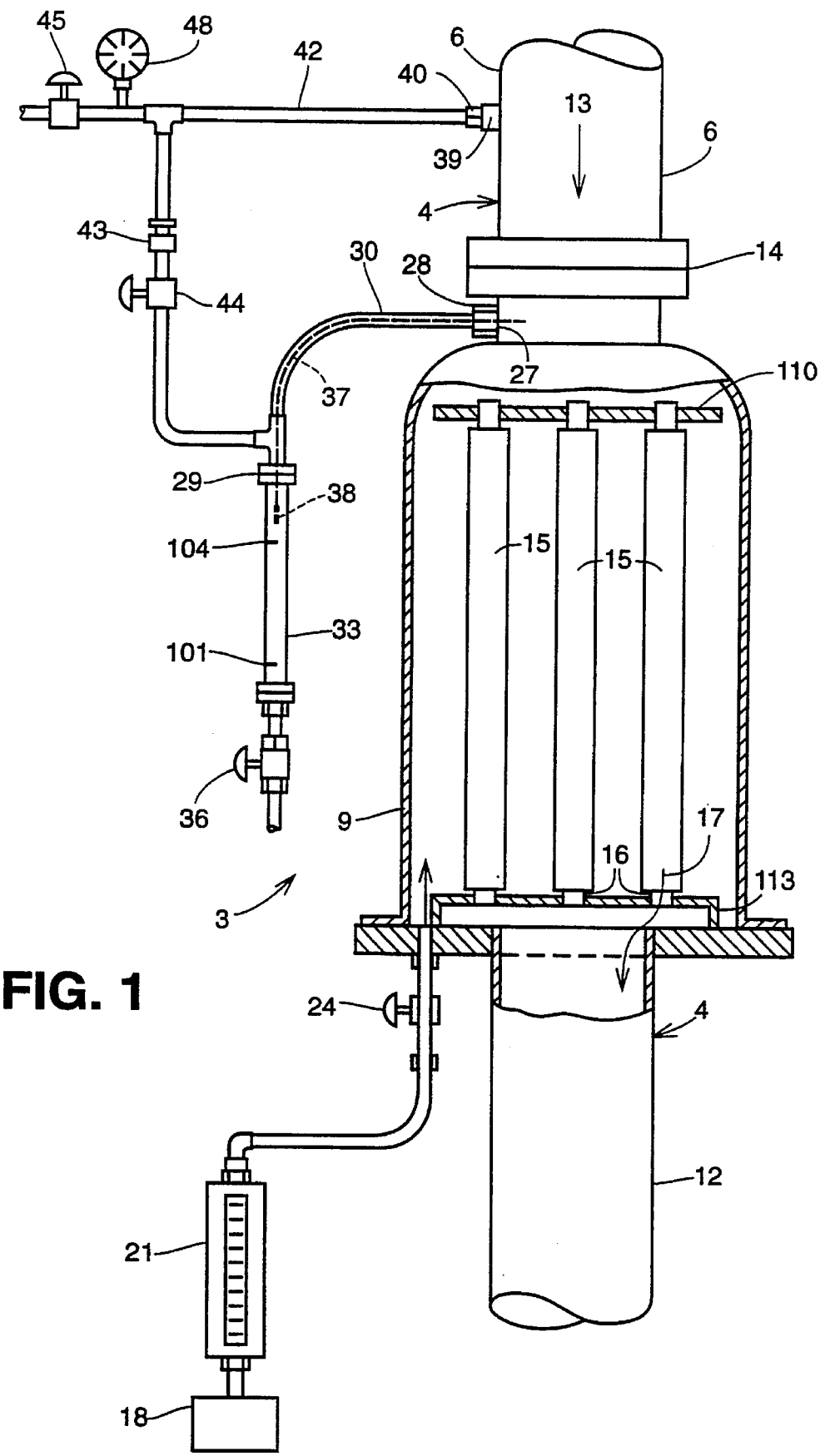
FIG. 1 is a cross-sectional schematic view of an exemplary apparatus of this invention.

Any microporous hydrophobic single or multiple membrane filter cartridge(s) and filter system integrity may be tested in situ using the apparatus and method of this invention. Typically, a single filter cartridge is comprised of a polymeric cylindrical support structure. Inside the support structure a tubular fluted filter membrane (the flute folds are parallel to the tube) is supported on the outside by a coarse fluted polymeric grid.

Generally the filter cartridges are 25 centimeter (cm) to 105 cm in length and 5 cm to 10 cm in outer diameter. The filter cartridges are sealed on one end of the tube and open to the downstream flow on the opposite end. The downstream flow connection is sealed by means of suitable O-ring seals. These cartridges are installed in single or multiple configurations into a suitable mounting plate within a filter housing. Typical hydrophobic membrane materials for gas filtration applications include polyvinylidene fluoride and polytetrafluoroethylene, although this invention is not limited to such filter materials. Exemplary filters are available as Aerex™ filters from Millipore Inc., (Bedford, Mass.) and Sartoflour GA™ filters from Sartorius Inc., (Bohemia, Long Island, N.Y.).

A clearer understanding of this invention may be had by reference to the Figure. The apparatus 3 includes a pipe 4 which extends from the upstream end 6 (and upstream direction) to an intermediate filter housing 9 and to a downstream end 12 (and downstream direction) of the pipe 4. By pipe is meant any suitable conduit type device. The upstream end 6 of the pipe 4 is connected to a source of gas (e.g., air) pressure 13 capable of providing a predetermined pressure of about 0.5 bar pressure to about 4.1 bar pressure, preferably 1.5 bar to 2.3 bar. The upstream end 6 of the pipe 4 is in fluid communication with the filter housing 9 to which it is sealed at joint and gasket 14. The filter housing 9 is closed off to the inlet of the downstream end 12 of the pipe 4 at joint 16, however, a fluid pathway 17 is provided between the filter housing 9 and the downstream end 12 of the pipe 4 through the hydrophobic filters 15 which are contained within the filter housing 9. Thus, gas can flow from the upstream end 6 of the pipe 4, into the filter housing 9, through the hydrophobic filter 15 and into the downstream end 12 of the pipe 4. A brace 110 and mounting plate 113 hold the filters hydrophobic membrane 15 in place. In multiple cartridge housings a plurality of hydrophobic filters are used in a spaced apart array.

A source of water 18 is connected to a means for metering (measuring the flow rate) of the water 21 (e.g., flowmeter). The metering means 21 is connected to an inlet valve 24 provided on the filter housing 9. Generally the water source 18 and metering means 21, in combination, are selected to provide a flow rate that is no greater than the flow rate from the overflow outlet (described below). For conventional systems this inflow is generally about 5 ml./min. to about 50 ml./min. and preferably about 15 ml./min. to about 25 ml./min. Typically most filter housings have a drain valve that may be advantageously used for the water inlet 24.

An overflow outlet 27 is disposed upstream of the hydrophobic filters 15 and water inlet 24 and preferably upstream of the filter housing 9. The overflow outlet 27 is connected via couplings 28, 29 and tubing 30 to a measuring means for measuring the flow of a liquid. For example, a collection housing such as a graduated cylinder 33 connected to a valve 36 (e.g., stopcock) may be used. The valve 36 allows for convenient drainage of the graduated cylinder 33 prior to and subsequent to a water integrity test run. The graduation markings 101, 104 facilitate the measurement of the water flow. In addition, the graduated cylinder 33 and valve 36 preferably allow for the closed system to maintain the desired pressure.

Preferably, the overflow outlet 27 includes a wick means 37 for breaking the surface tension therein. Preferably, it extends through the overflow outlet 27, through the tubing 30 and into the graduated cylinder 33. Suitable wick means include a fibrous flexible member 37 such as a pipe cleaner or string. The wick 37 breaks the fluid surface tension at the overflow inlet (point) 27 and in the overflow tubing 30. This prevents the fluid level from rising above the overflow point 27 and also aids in ensuring a steady, repeatable, and reproducible overflow at extremely low flow rates. It is especially preferred that a means for providing a drip point, such as a plastic tip 38, is attached to the wick 37 as this also aids ensuring a steady, repeatable, and reproducible overflow into the graduated cylinder 33 at low flow rates. This drip point provides a means to break the capillary action of the wick device. It is also preferable that the wick 37, and especially preferred that the drip point 38 do not contact the graduated cylinder 33, as it is believed that intimate contact may draw the test fluid into the graduated cylinder at an artificially fast rate due to capillary action. In addition, it is preferred not to have the wick draw the water level in the housing 9 down below the outlet 27.

A gas pressure outlet 39 is disposed upstream of the overflow outlet 27. A separate pressure equalization tube 42 is connected to the outlet 39 by a coupling 40 and the overflow outlet tube 30 by a coupling 43. The pressure equalization tube 42 is used to maintain fluid communication between the gas pressure outlet 39 and the measuring means (e.g., graduated cylinder 33). Thus, the outlet 39 and tube 42 equalize pressures between the overflow point 27 and the in-line graduated cylinder 33 facilitating the prevention of vapor lock in the overflow outlet tubing 30. This aids in assuring test device repeatability and reproducitility. A stopcock 44 may be positioned on the air equalization tube 42 for convenience. A gas pressure control valve 45 and pressure gauge 48 connected to the pressure equalization tube 42 facilitates the maintenance of the desired pressure in the system (as described below).

The method of this invention comprises filling the above described system with water or other suitable test fluid through water inlet subassembly 18, 21 and 24 until overflow begins through the overflow outlet 27. Suitable test fluids are liquid at the operating temperatures and have a viscosity that will not hinder the steady overflow at point 27. Convenient test operating temperatures are between about 10 degrees C. and about 20 degrees C., and it is especially preferred that test runs are performed at relatively constant temperature as varying the temperature may alter the test readings. Preferably, the water is just filled to the level of the overflow outlet 27 so that a continuous drip occurs. Pre-wetting the wick 37 with water during the attachment of the over flow device at outlet 27 may be used to quicken the time needed to equilibrate a steady water overflow.

The system is pressurized by controlling the gas source and the gas pressure release valve or control valve 45. Typically, the gas pressure is controlled to achieve a predetermined pressure of about 0.5 bar to about 4.1 bar, preferably about 1.5 bar to about 2.3 bar. These gas pressures are sufficient to overcome the water repellent forces of the hydrophobic membrane and force the water into intimate membrane contact, and intrude through any membrane defect without damaging the hydrophobic membrane. Then the test fluid is metered through the metering means 21 at a controlled and steady flow rate.

Preferably, the test fluid is metered at a rate that is no greater than the rate of flow achievable through the overflow outlet 27. This avoids the test fluid filling beyond the overflow point 27 and up into the upstream end 6 of the pipe 4. Because this test methodology depends on maintaining a relatively constant level of test fluid at the overflow point 27 an increase in the test fluid level is preferably avoided (i.e., an increase of test fluid level could provide a false difference between the measured inlet flow and outlet overflow). For example, if the test fluid level increases, the overflow rate would be observed as being less that the rate actually should be and as a consequence it would appear that the filter is absorbing more test fluid than it actually is absorbing. For conventional systems the overflow rate is generally about 5 ml./min. to about 50 ml./min. and preferably about 15 ml./min. to about 25 ml./min.

Preferably, the test fluid flow is allowed to reach equilibrium (this occurs when the test fluid has made intimate contact with the entire fluted membrane area and a steady overflow rate is maintained) before successive overflow rate measurements are used to calculate the fluid take-up rate into the filter. In one particular test methodology, the graduated cylinder 33 is drained to a point, that is below a convenient starting mark 101, through the drain valve 36 and then the drain valve 36 is closed. Then, the time is measured for the test fluid level to rise from the starting mark 101 to a 10 ml. mark 104. This flow rate is compared to the metered inlet flow rate and the difference is a measure of the water intrusion into the hydrophobic filter and thus the integrity of the filter.

Typical hydrophobic filters that have been found integral by traditional bubble point and diffusion flow tests have exhibited very slight water take up rates of about 0.10 ml/min.m$^2$ to about 0.20 ml/min.m$^2$. Non-integral filters, as judged by traditional methods, have shown water take up rates in excess of 2 ml/min.m$^2$ per defective cartridge. Typical filter housings contain single cartridges (about 0.5 m$^2$ to about 2 m$^2$ effective filtration area) or multiple filter cartridges (about 2 m$^2$ to about 30 m$^2$ effective filtration area). Thus, by detecting in the order of about 1.8 to about 1.9 ml/min.m$^2$ difference per single defective cartridge between the inlet and overflow rates, a correlation can be made to the integrity of the filter system.

This test apparatus and methodology is used to ascertain the integrity of the hydrophobic filter(s) and filter housing. The water uptake rates can be correlated to the integrity of the filters (e.g., ability to retain bacterial challenges). Thus, it has widespread application throughout the fermentation, pharmaceutical, biotech, and electronics industries.

This invention provides a means for in situ, upstream, non-destructive, and on-line integrity testing that is significantly less dependent on the existence or effect of any system pressure leaks. It is simple to implement and can utilize most existing process connections normally present on typical installations. Thus, major process piping connections need not be disturbed prior to and post testing, and true in situ testing may be accomplished. By significantly reducing the dependence on system pressure changes, this invention is extremely practical and economical. System pressure leaks mask true test values and cause "false failure" and/or inconclusive integrity test results. This invention allows the user to properly determine filter system integrity at any convenient time.

It should be understood that the invention is not limited to the particular embodiments shown and described herein; but that various changes and modifications may be made without departing from the spirit and scope of this novel concept as defined by the following claims.

I claim:

1. An apparatus for testing the integrity of a hydrophobic filter comprising:
   a. a pressurizable system including a pipe having an upstream end and a downstream end and a hydrophobic filter housing disposed inbetween;
   b. said hydrophobic filter housing having a hydrophobic filter disposed therein;
   c. said hydrophobic filter housing having an inlet, said hydrophobic filter housing inlet in fluid communication with said upstream end of said pipe;
   d. said hydrophobic filter housing closed to said downstream end of said pipe, but in fluid communication with said downstream end of said pipe through said hydrophobic filter;
   e. said system having a second inlet, said second inlet disposed upstream of said downstream end of said pipe, and said second inlet including a means for metering a liquid at a pre-determined flow inlet rate;
   f. said pipe having an overflow outlet upstream of said hydrophobic filter and upstream of said second inlet;
   g. said overflow outlet in fluid communication with a measuring means for measuring the flow of a liquid passing into said overflow outlet; and
   h. a gas pressure outlet disposed upstream of said overflow outlet, said gas pressure outlet in fluid communication with said measuring means through a separate pressure equalization tube.

2. The apparatus for testing the integrity of a hydrophobic filter as recited in claim 1 wherein the apparatus is capable of withstanding a pressure of at least 0.5 bar.

3. The apparatus for testing the integrity of a hydrophobic filter as recited in claim 2 wherein said overflow outlet has a wick means disposed internally along a length therein for breaking surface tension therein.

4. The apparatus for testing the integrity of a hydrophobic filter as recited in claim 3 wherein the hydrophobic filter is a polytetrafluoroethylene or polyvinylidene fluoride filter.

5. The apparatus for testing the integrity of a hydrophobic filter as recited in claim 4 wherein a means for providing a drip point is attached to the wick means.

6. The apparatus for testing the integrity of a hydrophobic filter as recited in claim 5 wherein said measuring means comprises a graduated cylinder and said wick means extends into said graduated cylinder.

7. The apparatus for testing the integrity of a hydrophobic filter as recited in claim 6 wherein said wick means is a pipe cleaner or string.

8. A method for testing the integrity of a hydrophobic filter comprising:

a. filling a hydrophobic filter housing with water and pressurizing a hydrophobic filter a hydrophobic filter with water, said hydrophobic filter included in a pressurizable system, said system including a pipe having an upstream end and a downstream end and a hydrophobic filter housing disposed inbetween, wherein the hydrophobic filter housing has said hydrophobic filter disposed therein and said hydrophobic filter housing has an inlet, said hydrophobic filter housing inlet in fluid communication with said upstream end of said pipe and said hydrophobic filter housing closed to said downstream end of said pipe, but in fluid communication with said downstream end of said pipe through said hydrophobic filter, said system provided with a second inlet, said second inlet disposed upstream of said downstream end of said pipe, said system provided with an overflow outlet upstream of said hydrophobic filter and said second inlet, and a gas pressure outlet disposed upstream of said overflow outlet;

b. controlling the air pressure in said pressurizable system to attain a predetermined pressure;

c. metering water into said system through said second inlet until overflow occurs through said overflow outlet at a rate that is not greater than the rate of flow achievable through said overflow outlet;

d. measuring the rate of water flow from said overflow outlet into a collection housing;

e. maintaining fluid communication between the gas pressure outlet and said collection housing through a separate pressure equalization tube; and f. determining the difference between the Water inflow rate and the water overflow rate, where the magnitude of any observed difference indicates a water take up rate of said filter and decides an integral or a non-integral filter.

9. The method for testing the integrity of a hydrophobic filter as recited in claim 8 wherein the air pressure is maintained at a pressure of about 0.5 bar to about 4.1 bar.

10. The method for testing the integrity of a hydrophobic filter as recited in claim 9 wherein said water is metered into said second inlet at a rate of about 5 ml./min. to about 50 ml./min.

11. The method for testing the integrity of a hydrophobic filter as recited in claim 10 wherein said water is metered into said second inlet at a rate of about 15 ml./min. to about 25 ml./min.

12. The method for testing the integrity of a hydrophobic filter as recited in claim 11 wherein the water flow from said overflow outlet is characterized by having a fluid surface tension that is broken.

* * * * *